(12) United States Patent
Yamamoto

(10) Patent No.: US 8,356,835 B2
(45) Date of Patent: Jan. 22, 2013

(54) SIDE AIR BAG APPARATUS AND MANUFACTURING METHOD OF A SIDE AIR BAG

(75) Inventor: Kazuhito Yamamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/256,836

(22) PCT Filed: May 19, 2010

(86) PCT No.: PCT/IB2010/001173
§ 371 (c)(1),
(2), (4) Date: Sep. 15, 2011

(87) PCT Pub. No.: WO2010/133950
PCT Pub. Date: Nov. 25, 2010

(65) Prior Publication Data
US 2012/0049494 A1    Mar. 1, 2012

(30) Foreign Application Priority Data
May 20, 2009 (JP) ................................ 2009-121668

(51) Int. Cl.
*B60R 21/207* (2006.01)
*B60R 21/233* (2006.01)
(52) U.S. Cl. ..................................... 280/730.2; 280/729
(58) Field of Classification Search ............... 280/730.2, 280/729
See application file for complete search history.

(56) References Cited

U.S. PATENT DOCUMENTS

| 5,853,191 | A  | * | 12/1998 | Lachat ......................... 280/730.2 |
| 7,900,957 | B2 | * | 3/2011  | Honda ........................... 280/729 |
| 2003/0006587 | A1 | * | 1/2003 | Jang et al. .................. 280/730.2 |
| 2005/0218635 | A1 | * | 10/2005 | Wipasuramonton et al. ......................... 280/730.2 |
| 2009/0212539 | A1 | * | 8/2009 | Honda et al. .................. 280/729 |

FOREIGN PATENT DOCUMENTS
DE   10 2006 023 271 A1   11/2007
(Continued)

OTHER PUBLICATIONS
International Search Report in International Application No. PCT/IB2010/001173; Mailing Date: Jul. 26, 2010.
(Continued)

*Primary Examiner* — Ruth Ilan
(74) *Attorney, Agent, or Firm* — Finnegan, Henderson, Farabow, Garrett & Dunner, LLP

(57) ABSTRACT

A protruding portion that is exposed from the outer peripheries of upper base cloths and a lower base cloth and provided with an insertion hole for inserting an inflator is provided on a portion of a tube base cloth. The inflator is inserted into the side air bag through the insertion hole. The peripheral edge portion of the insertion hole is fixed to the inflator by a clamp. The upper base cloths are not sewn to together in an area where the outer peripheries of the upper base cloths overlap with the tube base cloth, and the lower base cloth is not sewn to itself in an area where the outer periphery of the lower base cloth overlaps with the tube base cloth.

6 Claims, 16 Drawing Sheets

FOREIGN PATENT DOCUMENTS

| | | |
|---|---|---|
| EP | 1 559 620 B1 | 4/2009 |
| JP | 2003-501303 | 1/2003 |
| JP | 2005-531451 | 10/2005 |
| JP | 2008-1221 | 1/2008 |
| JP | 2008-120207 | 5/2008 |
| JP | 2008-120290 | 5/2008 |
| WO | WO 00/46076 A1 | 8/2000 |
| WO | WO 2006/021281 A1 | 3/2006 |

OTHER PUBLICATIONS

Written Opinion of the International Searching Authority in International Application No. PCT/IB2010/001173; Mailing Date: Jul. 26, 2010.

\* cited by examiner

SIDE AIR BAG APPARATUS AND MANUFACTURING METHOD OF A SIDE AIR BAG

CROSS-REFERENCE TO RELATED APPLICATIONS

This application is a national phase application of International Application No. PCT/IB2010/001173, filed May 19, 2010, and claims the priority of Japanese Application No. 2009-121668, filed May 20, 2009, the contents of both of which are incorporated herein by reference.

BACKGROUND OF THE INVENTION

1. Field of the Invention

The invention relates to a side air bag apparatus and a manufacturing method of a side air bag.

2. Description of the Related Art

Japanese Patent Application Publication No. 2008-120207 (JP-A-2008-120207) describes a side air bag apparatus in which an inflator is inserted through an insertion hole in a protruding portion (i.e., mounting portion) formed protruding below a side air bag, and the inflator is fastened airtight to the side air bag by fitting and crimping a ring clamp around the outside of the protruding portion.

However, with a structure in which the protruding portion of the side air bag is simply crimped to the inflator using a ring clamp as in the side air bag apparatus described above, the outer periphery of the bag near the crimped portion is constricted and thus will not easily inflate. As a result, when the side air bag receives a supply of gas from the inflator and consequently inflates and deploys, the pressure of the gas may tend to concentrate near the crimped portion.

One way to combat this is to increase the curvature radius of the contour of the outer periphery of the bag so that bag is not as restricted near the crimped portion. The problem with this approach, however, is that the restraining area of the side air bag ends up being decreased by a corresponding amount.

SUMMARY OF THE INVENTION

This invention thus provides a side air bag apparatus in which an inflator is arranged inside a side air bag, and the pressure of gas is inhibited from concentrating near an insertion hole for an inflator when the side air bag inflates and deploys, without affecting the external bag shape of the side air bag.

A first aspect of the invention relates to a side air bag apparatus. This side air bag apparatus includes an inflator that injects gas during a side collision, and a side air bag that has an upper bag portion formed by sewing upper base cloths together, a lower bag portion that is formed by sewing a lower base cloth to itself and positioned below the upper bag portion, a partition that separates the upper bag portion from the lower bag portion, and a tube that i) is formed by tube base cloth and extends through the partition to the lower bag portion side and the upper bag portion side, ii) has a first open portion provided on one end that is positioned on the lower bag portion side, and a second open portion provided on the other end that is positioned on the upper bag portion side, and iii) distributes the gas from the inflator to the upper bag portion and the lower bag portion. A protruding portion that is exposed from the outer peripheries of the upper base cloths and the lower base cloth is provided on a portion of the tube base cloth; an insertion hole for the inflator is formed in the protruding portion. The upper base cloths are not sewn together in the areas where the outer peripheries of the upper base cloths overlap with the tube base cloth, and the lower base cloth is not sewn to itself in the area where the outer periphery of the lower base cloth overlaps with the tube base cloth. The tube base cloth is sewn together with at least one of the upper base cloths and the lower base cloth, and the peripheral edge portion of the insertion hole in the protruding portion is fixed to the inflator by a clamp.

With this side air bag apparatus, the side air bag inflates and deploys by gas from the inflator being supplied to the side air bag during a side collision. At this time, the gas from the inflator is distributed by the tube to the upper bag portion and the lower bag portion.

The protruding portion that is exposed from the outer peripheries of the upper base cloths and the outer periphery of the lower base cloth and in which the insertion hole for inserting the inflator is formed is provided at a portion of the tube base cloth. The inflator is inserted into the side air bag through this insertion hole. The peripheral edge end of this insertion hole is fastened or held (i.e., fixed) to the inflator by the clamp. The upper base cloths are not sewn together in the areas where the outer peripheries of the upper base cloths overlap with the tube base cloth, and the lower base cloth is not sewn to itself in the area where the outer periphery of the lower base cloth overlaps with the tube base cloth. Accordingly, when the inflator activates, the side air bag is also able to inflate in the areas where the outer peripheries of the upper base cloths and the outer periphery of the lower base cloth overlap with the tube base cloth. Therefore, in the side air bag apparatus in which the inflator is arranged inside the side air bag, the pressure of the gas can be inhibited from concentrating near the insertion hole for the inflator when the side air bag inflates and deploys, without affecting the bag outer shape of the side air bag.

In the structure described above, the tube may be formed by sewing the tube base cloth that has been sewn to the lower base cloth to an upper end portion of the lower base cloth, folding the tube base cloth in two toward the front of a vehicle about a folding axis, sewing the resultant front end portions together in the length direction of the tube, and sewing the end edge of the protruding portion, except for at the insertion hole, closed. Further, the partition may be formed by sewing together the upper end portions of the lower base cloth that has been folded in two about the folding axis. The upper bag portion may be formed by sewing the outer peripheries of the upper base cloths together and the lower bag portion may be formed by sewing the outer periphery of the lower base cloth to itself.

With this side air bag apparatus, the partition that separates the upper bag portion from the lower bag portion is made up of the upper regions of the lower base cloth, and formed by sewing together the upper regions of the lower base cloth that has been folded in two about the folding axis. As a result, the side air bag having the upper bag portion and the lower bag portion is easier to sew, which enables mass productivity to be improved, compared with when the partition and the base cloth of the side air bag are separate.

Also, the tube that extends through the partition to the lower bag portion side and the upper bag portion side so as to distribute inflation gas to the upper bag portion and the lower bag portion is formed in a cylindrical shape by sewing the tube base cloth that has been sewn to the lower base cloth to the upper regions of the lower base cloth, folding that tube base cloth in two toward the front of the vehicle about the folding axis, sewing the resultant front end portions together in the length direction of the tube, and sewing the end edge except for at the insertion hole in the protruding portion closed. Meanwhile, the partition is formed by sewing the upper regions of the lower base cloth that has been folded in two about the folding axis together. As a result, the airtightness between the upper bag portion and the lower bag portion can be improved.

In this way, with the side air bag apparatus described above, the side air bag having the upper bag portion and lower bag portion that are separated from each other can be sewn easily, which enables mass productivity to be improved, and also enables the airtightness between the upper bag portion and the lower bag portion to be improved.

In the structure described above, the upper bag portion may be positioned at least one of chest and shoulder height of an occupant seated in a vehicle seat, and the lower bag portion may be positioned at waist height of the occupant.

Accordingly, when the side air bag inflates and deploys upon receiving a supply of gas during a side collision, at least one of the chest and the shoulder of the occupant can be restrained by the upper bag portion, and the waist of the occupant can be restrained by the lower bag portion.

In the structure described above, the insertion hole may be formed in the rear end portion of the protruding portion. Also, the inflator may be provided in the tube via the insertion hole and arranged such that the length direction of the inflator is the same as the vertical direction of the side air bag. Further, the protruding portion may be folded down such that the peripheral edge portion of the insertion hole fits around the inflator, and fixed by the clamp.

With this side air bag apparatus, the insertion hole is formed in the rear end portion, with respect to the longitudinal direction of the vehicle, of the protruding portion of the tube base cloth, and the inflator is inserted into the tube through the insertion hole and arranged so that the longitudinal direction of the inflator is the same as the vertical direction of the vehicle. The protruding portion is folded down such that the peripheral edge portion of the insertion hole fits around the inflator, and fastened or held (i.e., fixed) to the inflator by the clamp. As a result, the protruding portion of the tube base cloth can be inhibited from sticking out after the inflator has been assembled.

A second aspect of the invention relates to a manufacturing method of a side air bag. This manufacturing method includes sewing a tube base cloth to a bag inner surface side of a lower base cloth; sewing lower end portions of upper base cloths to a bag outer surface side, at lower ends of upper regions that are used to form a partition, of the lower base cloth; sewing a tube base cloth having an insertion hole for an inflator to a bag inner surface side of the upper regions; sewing the areas of the outer peripheries of the upper base cloths and the outer periphery of the lower base cloth that overlap with the tube base cloth to the tube base cloth; forming a tube by folding the tube base cloth in two toward the front side of a vehicle about a folding axis, sewing the resultant front end portions together, and sewing the end edge, except for at the insertion hole, of a protruding portion that is exposed from the outer peripheries of the upper base cloths and the lower base cloth, of the tube base cloth closed; forming the partition by folding the lower base cloth in two about the folding axis and sewing the upper regions together; and forming an upper bag portion by sewing the outer peripheries of the upper base cloths together except for at the areas that overlap with the tube base cloth, and forming a lower bag portion by sewing the outer periphery of the lower base cloth to itself except for at the area that overlaps with the tube base cloth.

With this manufacturing method of an air bag, the upper regions of the lower base cloth are used to form the partition wall. As a result, the side air bag having the upper bag portion and the lower bag portion is easier to sew, which enables mass productivity to be improved, compared with when a tether and the base cloth of the side air bag are separate.

Also, the tube base cloth is sewn to the bag inner side of the upper regions of the lower base cloth. The areas of the outer peripheries of the upper base cloths and the outer periphery of the lower base cloth that overlap with the tube base cloth are sewn to the tube base cloth. A cylindrical tube is formed by folding the tube base cloth in two about a folding axis, sewing the resultant front end portions together, and sewing the end edge, except for at the insertion hole, of the protruding portion that is exposed from the outer peripheries of the upper base cloths and the lower base cloth, of the tube base cloth closed. The partition is formed by folding the lower base cloth in two about the folding axis and sewing the upper regions together, thereby making it possible to improve the airtightness between the upper bag portion and the lower bag portion.

In this way, the manufacturing method of a side air bag described above makes the side air bag having the upper bag portion and the lower bag portion easier to sew, which enables mass productivity to be improved, as well as improves the airtightness between the upper bag portion and the lower bag portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
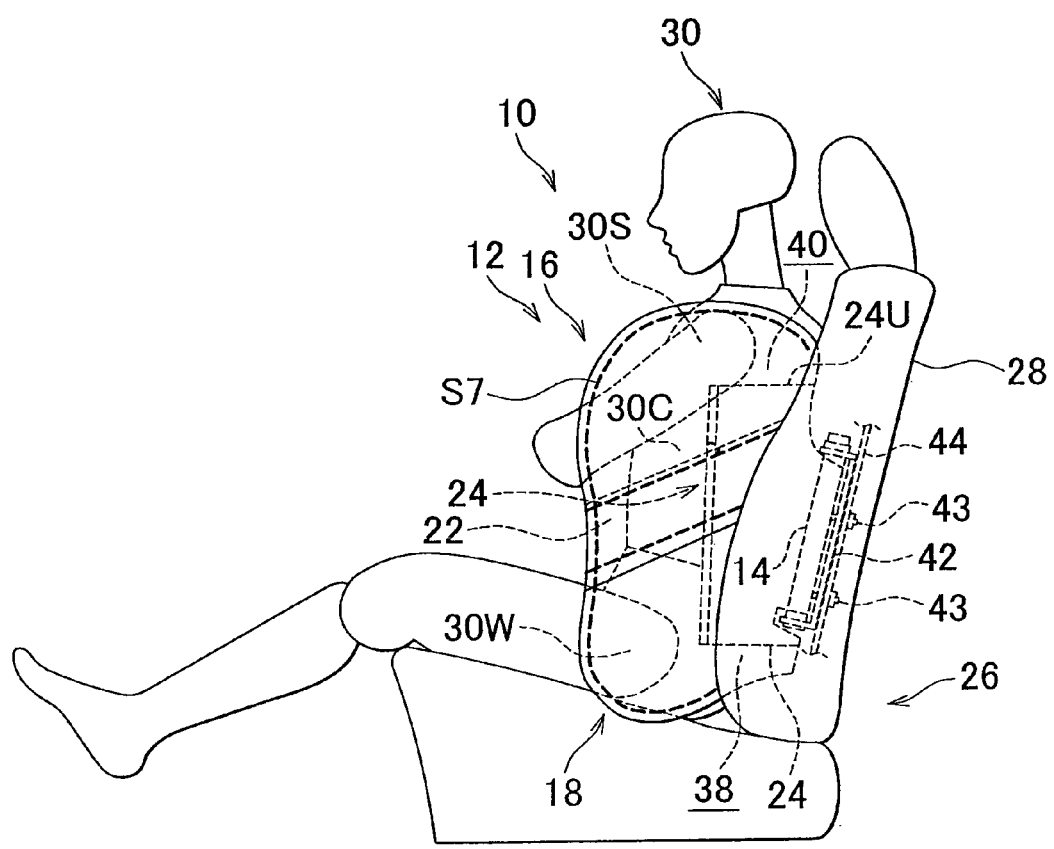
FIG. 1 is a side view of a side air bag shown inflated and deployed to the side of an occupant seated in a vehicle seat.

Example embodiments of the present invention will be described in greater detail below with reference to the accompanying drawings. A side air bag apparatus 10 according to one example embodiment includes a side air bag 12 and an inflator 14, as shown in FIG. 1.

Figure 2:
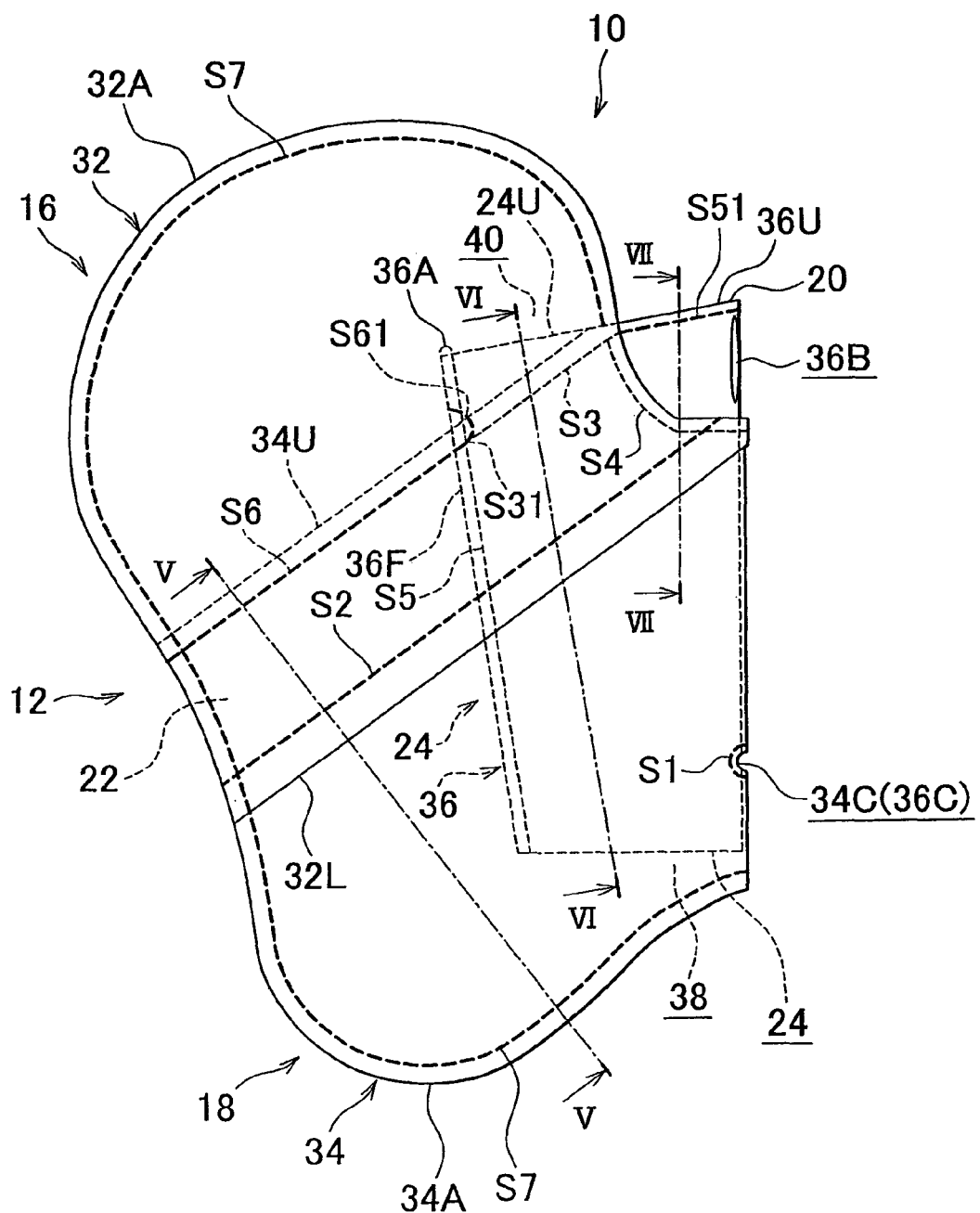
FIG. 2 is a side view of the side air bag.

The side air bag 12 has an upper bag portion 16, a lower bag portion 18, a partition 22, and a tube 24, as shown in FIG. 2. This side air bag 12 is normally stored folded in a side portion of a seat back 28 of a vehicle seat 26, for example, as shown in FIG. 1. During a side collision, gas is supplied to the side air bag 12 from the inflator 14, which causes the side air bag 12 to inflate and deploy next to an occupant 30 seated in the vehicle seat 26. Incidentally, in the drawing, a dummy is shown as the occupant 30.

The upper bag portion 16 is formed by sewing upper base cloths 32 together, and is an inflating portion that is positioned on the upper side in the vertical direction of the vehicle. The upper bag portion 16 is positioned at a height corresponding to that of the chest 30C and/or the shoulder 30S of the occupant 30 seated in the vehicle seat 26. In this example embodiment, the upper bag portion 16 is positioned at a height corresponding to both the chest 30C and the shoulder 30S of the occupant 30. Also, the lower bag portion 18 is formed by sewing a lower base cloth 34 to itself, and is an inflating portion that is positioned below the upper bag portion 16. The lower bag portion 18 is positioned at a height corresponding to the waist 30W of the occupant 30 seated in the vehicle seat 26. The inner surface of the lower base cloth 34 is coated with a coating to increase airtightness, for example, while the inner surface of the upper base cloth 32 is not coated with the coating.

Figure 8:
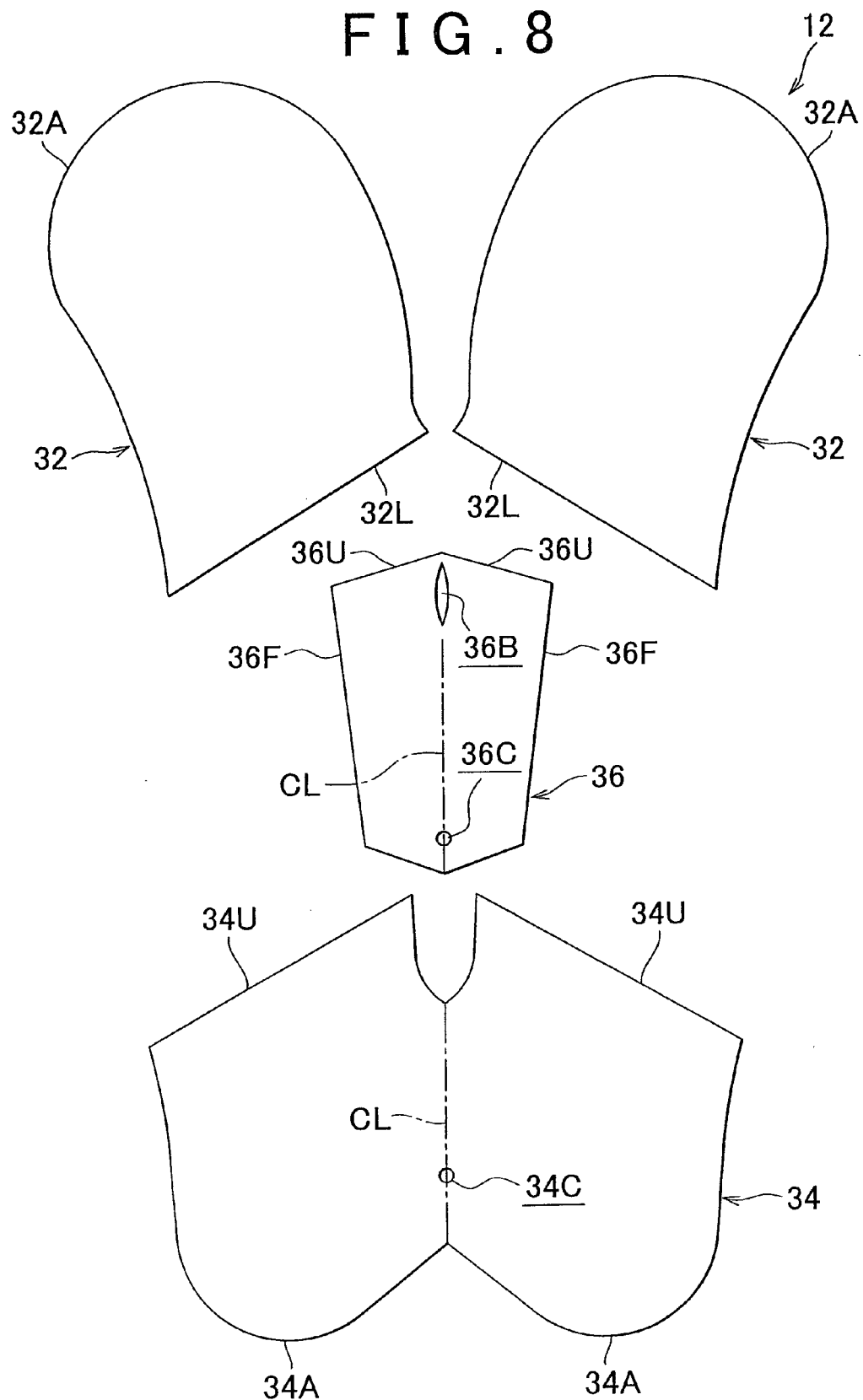
FIG. 8 is a projection view of the pieces of base cloth of the side air bag before sewing.

As shown in FIGS. 2 and 3 and 5 to 7, lower end portions 32L of the upper base cloths 32 are sewn to the bag outer surface side, at lower ends of upper regions 34U that are used to form a partition 22, of the lower base cloth 34 (a sewn portion S2). As shown in FIG. 8, the lower base cloth 34 is shaped so that it can be folded in two about a folding axis CL, i.e., it has a line-symmetric shape. The upper regions 34U fork off from the main portion of the lower base cloth 34. One upper base cloth 32 is sewn to one upper region 34U, and the other upper base cloth 32 is sewn to the other upper region 34U. In the projection view in FIG. 10, the upper base cloths 32 are positioned line-symmetrical with respect to the folding axis CL.

Figure 15:
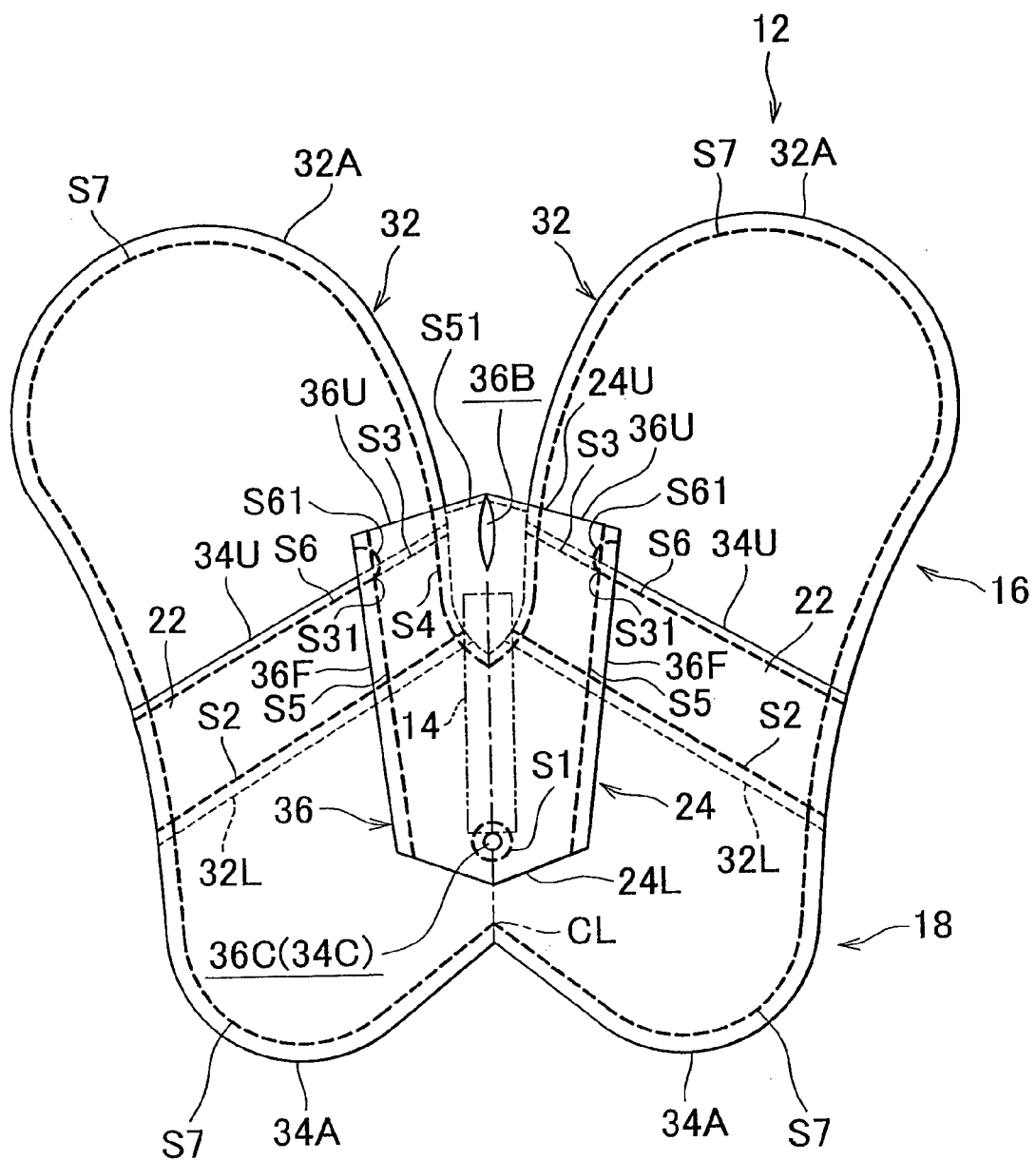
FIG. 15 is a projection view of an upper bag portion formed by sewing the outer peripheries of the upper base cloths together, and a lower bag portion formed by sewing the outer periphery of the lower base cloth to itself in a seventh step.

As shown in FIGS. 2 and 15, the upper bag portion 16 is formed by sewing the outer peripheries 32A of the upper base cloths 32 together, and the lower bag portion 18 is formed by sewing the outer periphery 34A of the lower base cloth 34 together (sewn portion S7). More specifically, the lower bag portion 18 is formed by folding the lower base cloth 34 in two about the folding axis CL and sewing the outer periphery 34A of the lower base cloth 34 to itself, except for at the area that overlaps with tube base cloth 36. Also, the upper bag portion 16 is formed by folding the upper base cloths 32 together with the lower bag portion 18 in two about the folding axis CL and sewing the outer peripheries 32A of the upper base cloths 32 together, except for at the area that overlaps with the tube base cloth 36.

As shown in FIGS. 2, 3, 5, and 6, the partition 22 is formed by the upper regions 34U of the lower base cloth 34 and is a portion that separates the upper bag portion 16 from the lower bag portion 18. This partition 22 is formed by sewing the upper regions 34U of the lower base cloth 34 that has been folded in two about the folding axis CL together.

Figure 3:
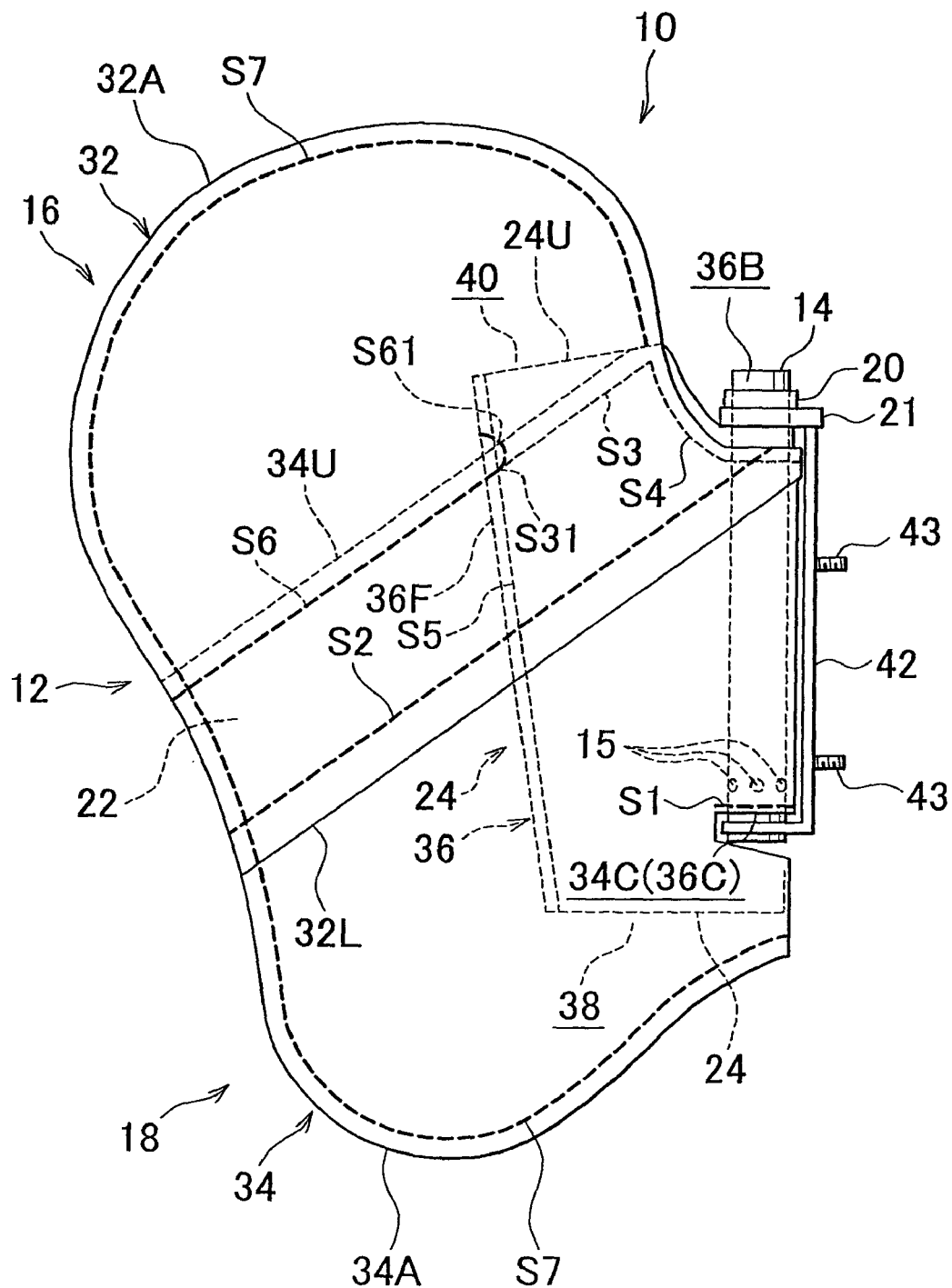
FIG. 3 is a side view of the side air bag to which an inflator has been assembled.
Figure 6:
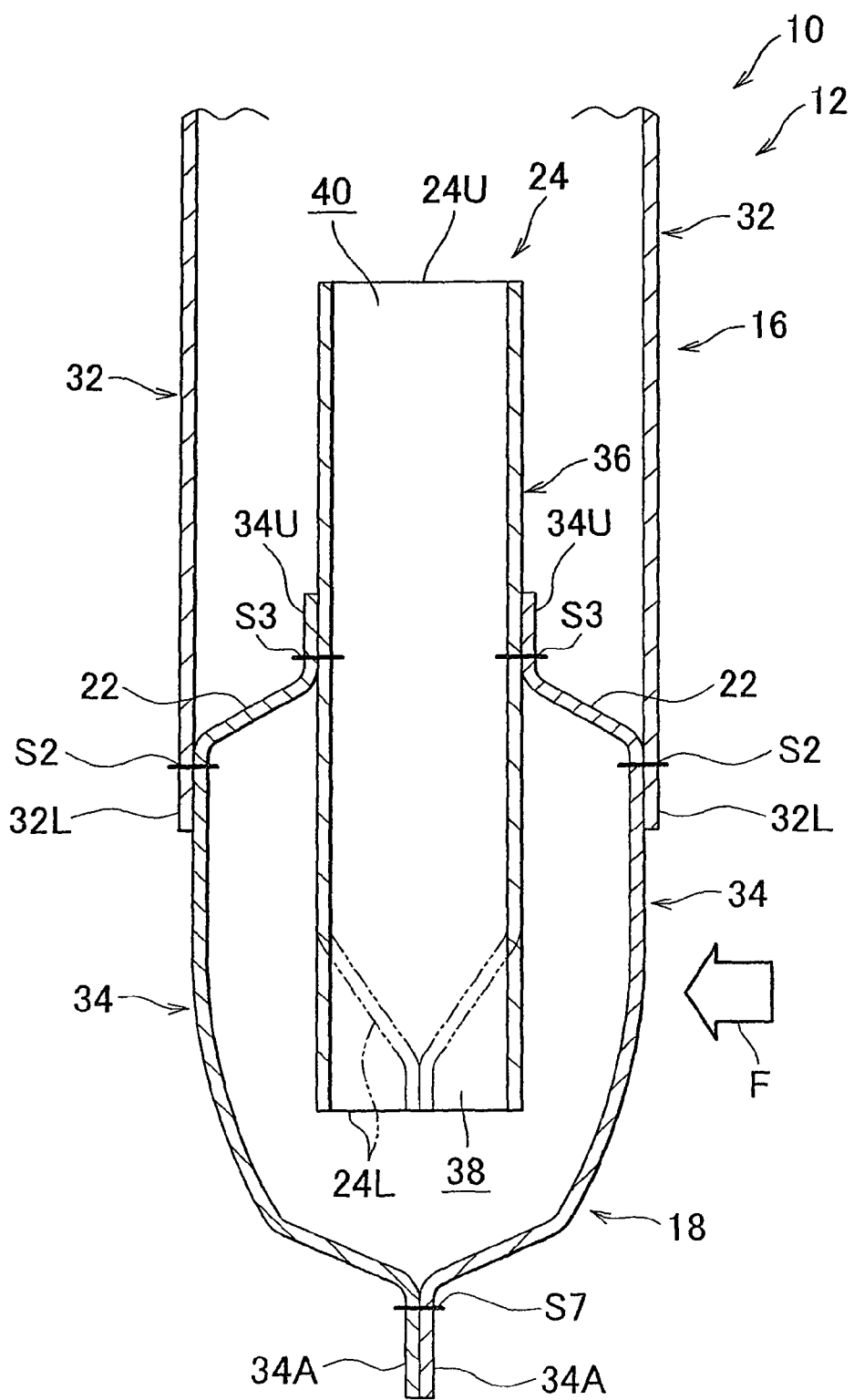
FIG. 6 is an enlarged sectional view taken along line VI-VI of the side air bag shown in FIG. 2.
Figure 7:
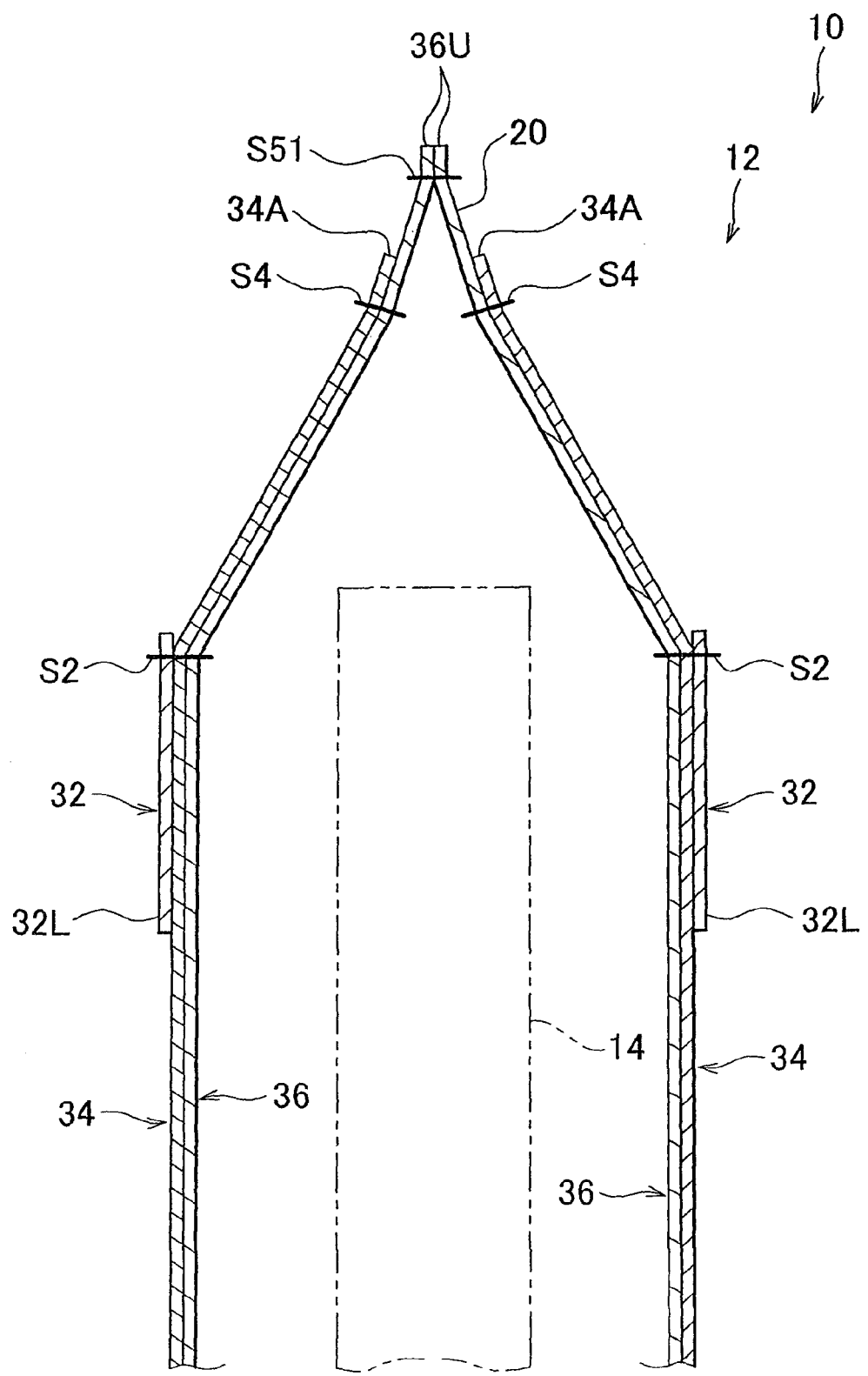
FIG. 7 is an enlarged sectional view taken along line VII-VII of the side air bag shown in FIG. 2.

As shown in FIGS. 2, 3, and 6, the tube 24 is formed by the tube base cloth 36 and extends to the lower bag portion 18 side and the upper bag portion 16 side through the partition 22. The tube 24 has two open portions 38 and 40. One of the open portions 38 is provided at one end 24L that is located on the lower bag portion 18 side, and the other open portion 40 is provided at the other end 24U that is located on the upper bag portion 16 side. This tube 24 is used to distribute inflation gas to the upper bag portion 16 and the lower bag portion 18.

Figure 11:
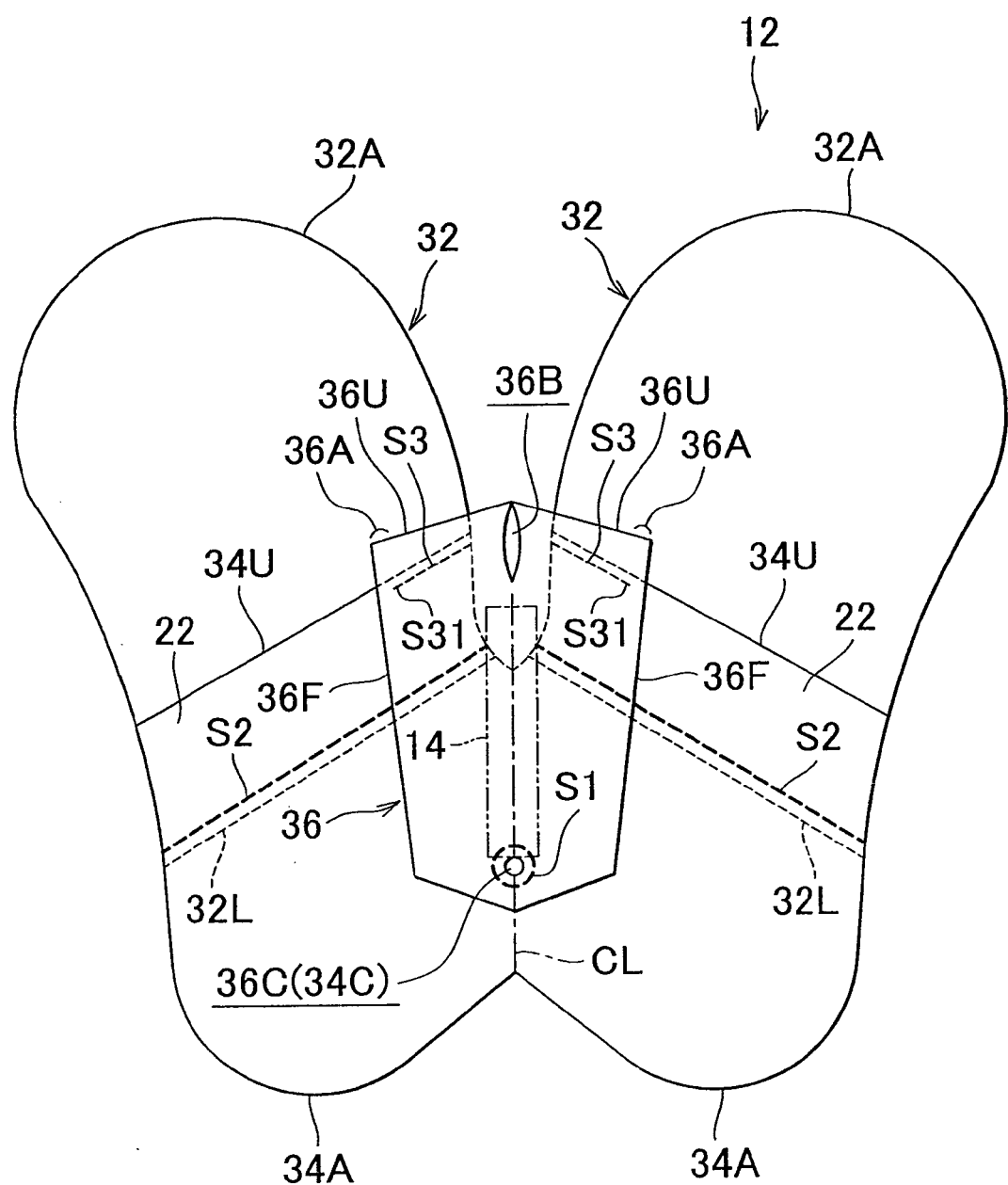
FIG. 11 is a projection view showing the tube base cloth sewn to the bag inner side of the upper regions of the lower base cloth in a third step.
Figure 12:
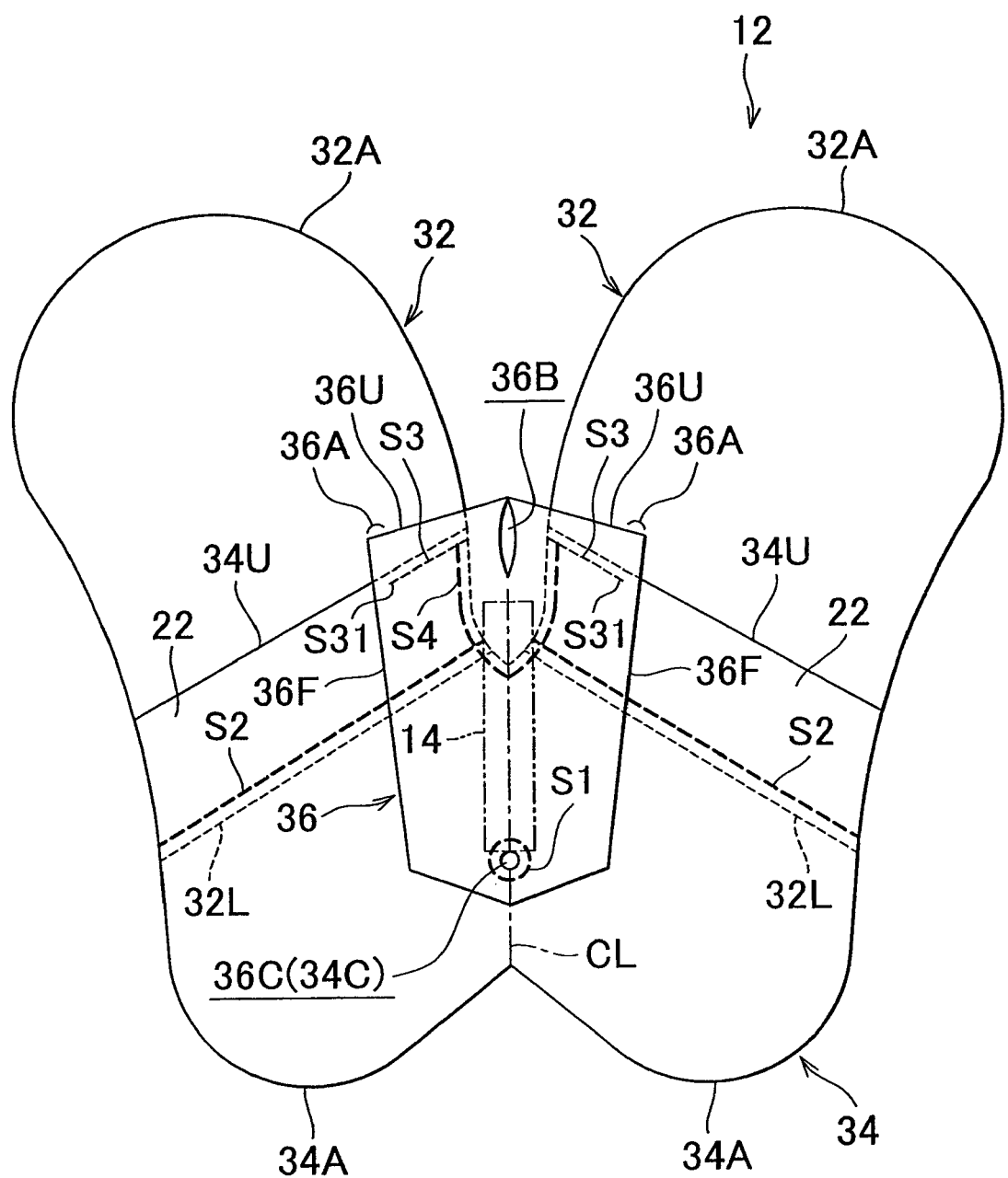
FIG. 12 is a projection view of areas of the outer peripheries of the upper base cloths and the outer periphery of the lower base cloth that overlap with the tube base cloth, sewn to the tube base cloth in a fourth step.
Figure 13:
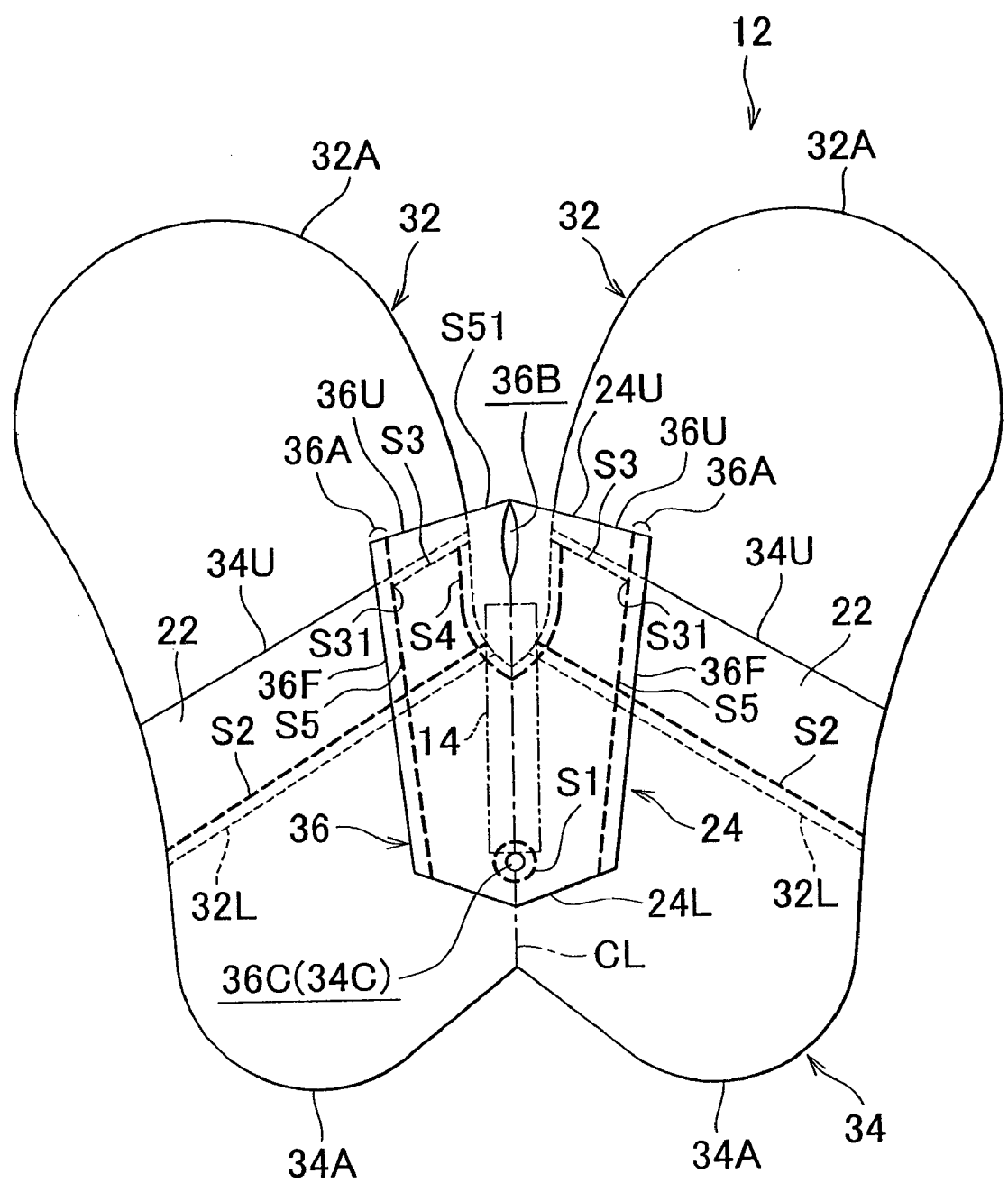
FIG. 13 is a projection view of a cylindrical tube formed by folding the tube base cloth in two about a folding axis toward the front of the vehicle, sewing the resultant front end portions together, and sewing the end edges, except for at the insertion hole for inserting the inflator, of the protruding portion that is exposed from the outer periphery of the upper base cloths and the lower base cloth, of the tube base cloth closed in a fifth step.

With this tube 24, the tube base cloth 36 that has been sewn to the lower base cloth 34 is then sewn to the upper regions 34U of the lower base cloth 34 (sewn portions S3), as shown in FIG. 11. Then the areas of the outer peripheries 32A of the upper base cloths 32 and the outer periphery 34A of the lower base cloth 34 that overlap with the tube base cloth 36 are sewn to the tube base cloth 36 (sewn portion S4), as shown in FIG. 12. Next, the tube base cloth 36 is folded in two toward the front of the vehicle (i.e., a valley fold) about the folding axis CL, and the resultant front end portions 36F of the tube base cloth 36 are sewn together in the length direction of the tube 24, while the end edge of the tube base cloth 36 except for at the insertion hole 36B for inserting the inflator 14 in the protruding portion 20 that is exposed from the outer peripheries 32A and 34A of the upper and lower base cloths 32 and 34, e.g., the upper end edge 36U, is sewn closed so as to form a cylinder (sewn portions S5 and S51), as shown in FIG. 13.

Figure 14:
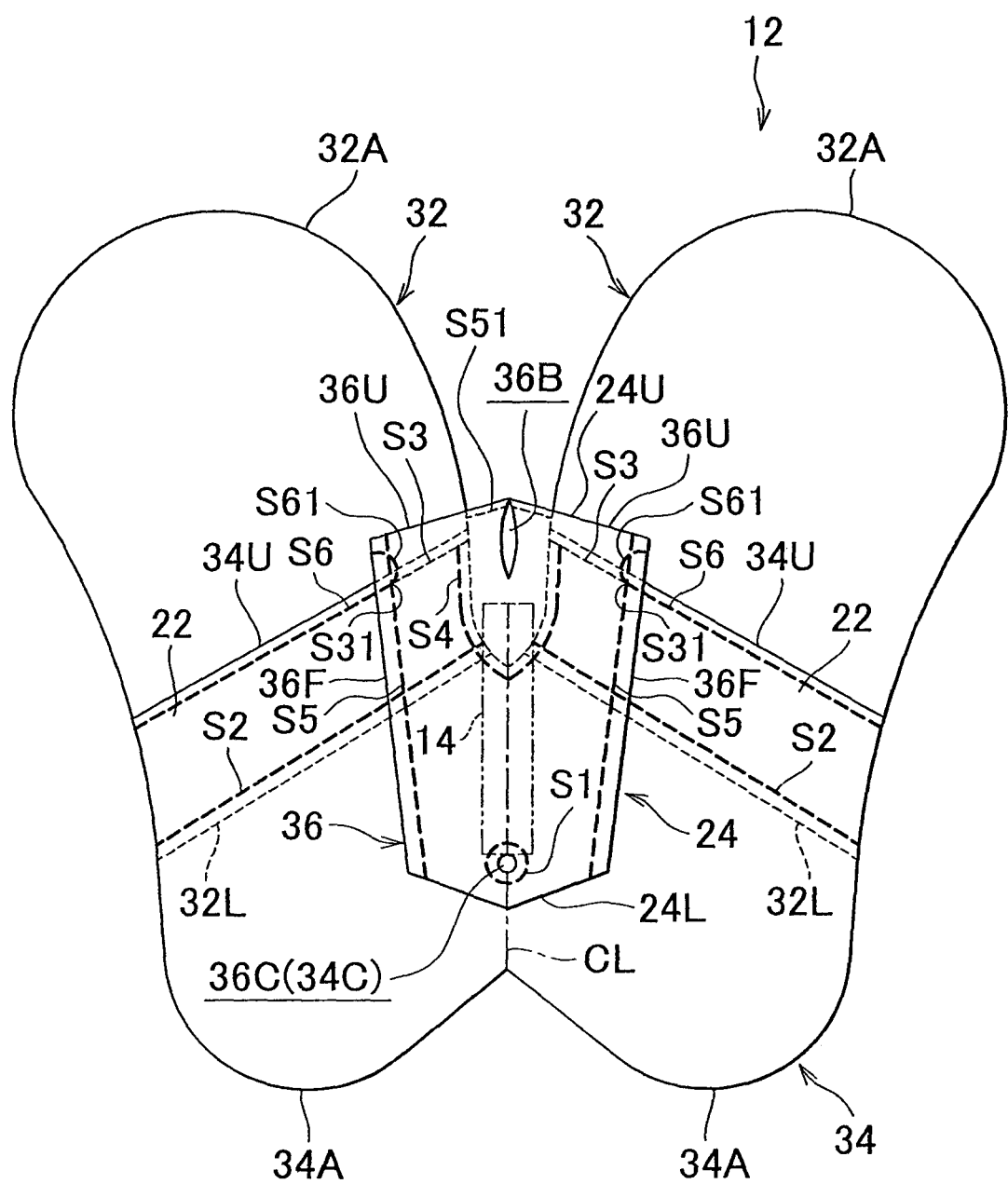
FIG. 14 is a projection view of the partition formed by folding the lower base cloth in two about a folding axis and sewing the upper regions together in a sixth step.

As shown in FIG. 11, the sewn portions S3 of the tube base cloth 36 and the upper regions 34U of the lower base cloth 34 stop just before reaching seam allowances 36A on the front end portions 36F of the tube base cloth 36, so as to leave those seam allowances 36A. Also, as shown in FIGS. 2 and 14, the upper regions 34U of the lower base cloth 34 are sewn up to the sewn portions S3 (sewn portion S6). More specifically, the sewn portion S6 extends from the front side to the rear side of the upper regions 34U of the lower base cloth 34, and the rear end portion S61 of that sewn portion S6 curves upward, for example, from the front end S31 of the sewn portions S3, for example, and terminates at the front end portions 36F of the tube base cloth 36, for example, such that the sewn portion S6 forms a U-shape. Incidentally, the location where the rear end portion S61 terminates is not limited to this.

Also, the shape of the rear end portion S61 of the sewn portion S6 is not limited to this curved shape. For example, the sewn portion S6 may also double back toward the sewn portions S3, for example, from the front end of the sewn portions S3, and terminate near the front end portions 36F of the tube base cloth 36.

Figure 9:
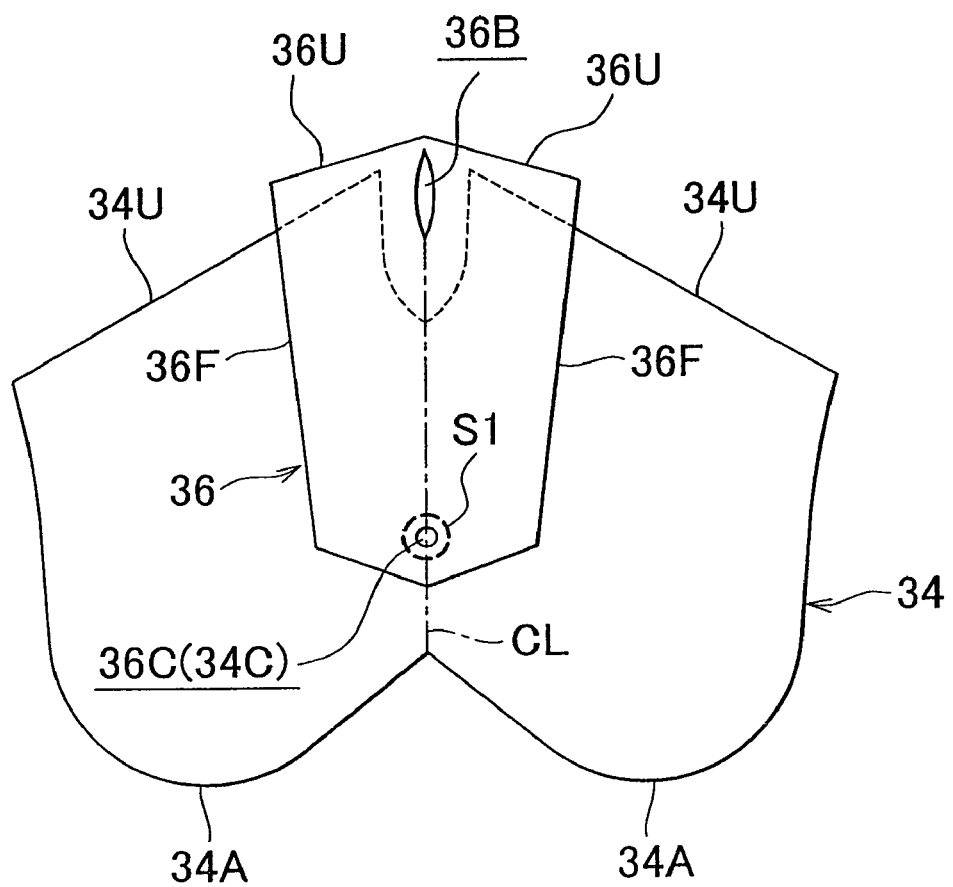
FIG. 9 is a projection view showing tube base cloth sewn to the bag inner surface side of lower base cloth in a first step.

As shown in FIGS. 8 and 9, an insertion hole 36B that is slit-shaped, for example, and a through-hole 36C that is circular, for example, are formed on the folding axis CL, for example, in the tube base cloth 36. A through-hole 34C that corresponds to the through-hole 36C in the tube base cloth 36 is formed on the folding axis CL in the lower base cloth 34. Then the tube base cloth 36 is attached to the lower base cloth 34 by sewing the peripheral edge portions of the through-holes 36C and 34C together, as shown in FIG. 9 (sewn portion S1).

Figure 10:
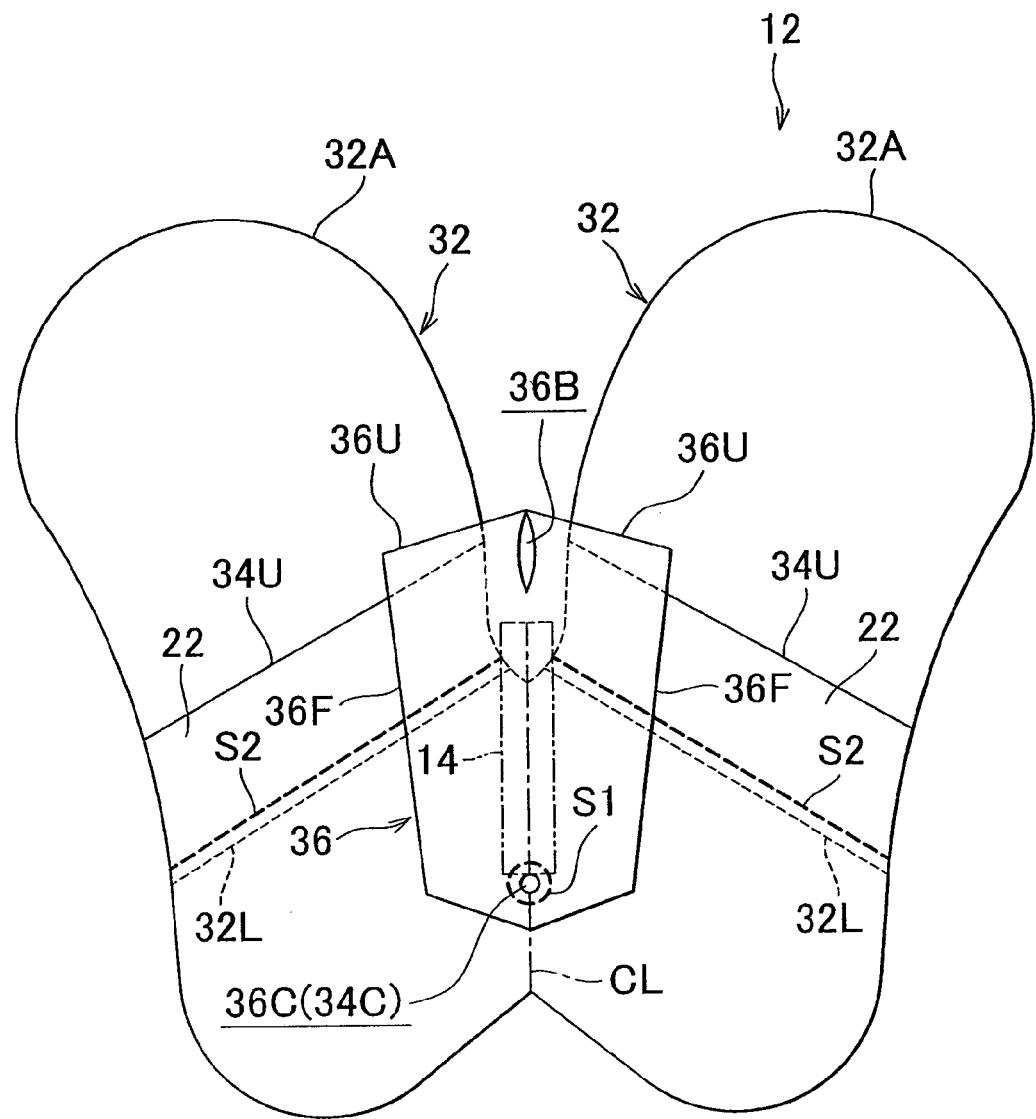
FIG. 10 is a projection view showing lower end portions of upper base cloths sewn to the bag outer surface side, at the lower ends of upper regions that are used to form a partition, of the lower base cloth in a second step.

As shown in FIG. 10, the insertion hole 36B in the tube base cloth 36 is positioned in an area that does not overlap with either the upper base cloths 32 or the lower base cloth 34. That is, this area is the protruding portion 20 that is exposed from the outer peripheries 32A and 34A of the upper and lower base cloths 32 and 34 (see FIG. 2). As a result, the insertion hole 36B is formed in the end portion that toward the rear of the vehicle, of the protruding portion 20, as shown in FIG. 2.

Figure 4:
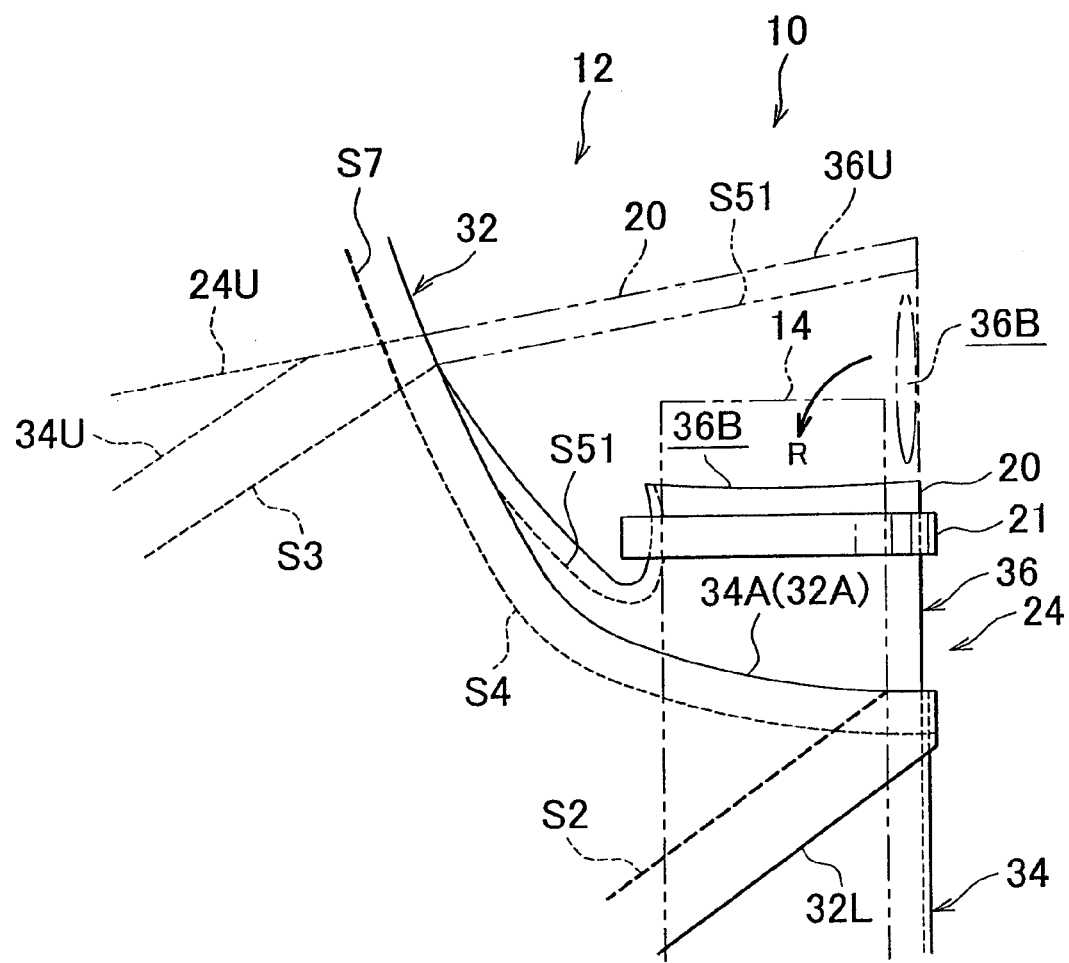
FIG. 4 is an enlarged side view of a main portion of FIG. 3, showing a protruding portion folded down such that the peripheral edge portion of an insertion hole for the inflator of the side air bag fits around the inflator, and fastened (i.e., fixed) to the inflator with a clamp.

Incidentally, as shown in FIG. 2, the upper base cloths 32 are not sewn together at the areas where the outer peripheries 32A of the upper base cloths 32 overlap with the tube base cloth 36, and the lower base cloth 34 is not sewn to itself at the area where the outer periphery 34A of the lower base cloth 34 overlaps with the tube base cloth 36. The sewn portion S4 is a portion where the tube base cloth 36 is sewn to the upper base cloths 32 and the lower base cloth 34 on both sides of the folding axis CL, as shown in FIG. 12, but the upper base cloths 32 are not sewn together, and the lower base cloth 34 is not sewn to itself, in the direction of thickness of the side air bag 12, as shown in FIG. 4.

Incidentally, the position of the through-hole 34C in the lower base cloth 34 and the positions of the insertion hole 36B and the through-hole 36C in the tube base cloth 36 are not limited to being on the folding axis CL. That is, they may also be offset from the folding axis CL shown in FIG. 8. In other words, the insertion hole 36B and the through-holes 34C and 36C shown in FIG. 2 may also be located on a side surface of the side air bag 12.

In the examples shown in the drawings, the upper portion of the tube 24 protrudes farther upward in the vertical direction of the vehicle (i.e., toward the upper bag portion 16 side) than the partition 22, but the amount that it protrudes is arbitrary. That is, the protrusion amount may be smaller, or larger as in a modified example that will be described later.

The inner surface of the lower base cloth 34 is coated with a coating to improve airtightness, while the inner surfaces of the upper base cloths 32 are not coated with the coating. Therefore, the internal pressure of the lower bag portion 18 when the side air bag 12 inflates and deploys is set higher than the internal pressure of the upper bag portion 16. Consequently, stronger material is used for the lower base cloth 34 than is used for the upper base cloths 32. The material used for the tube base cloth 36 is as strong or stronger than the material used for the lower base cloth 34.

As shown in FIGS. 1, 3, and 4, the inflator 14 which is cylindrical, for example, is arranged in the tube 24. This inflator 14 is inserted into the tube 24 through the insertion hole 36B in the tube base cloth 36, and is arranged so that the longitudinal direction of the inflator 14 is the same as the vertical direction of the side air bag 12. As shown in FIG. 3, gas injection holes 15 in the inflator 14 are arranged on the lower end side near the lower bag portion 18 side, for example. As shown in FIGS. 2 and 3, the protruding portion 20 is folded down such that the peripheral edge portion of the insertion hole 36B fits around the inflator 14, and held in place or fastened (i.e., fixed) by a clamp 21. As shown in FIG. 4, the insertion hole 36B is formed in the end portion toward the rear of the vehicle of the protruding portion 20. Thus, the peripheral edge portion of the insertion hole 36B can be fitted around the upper end portion of the inflator 14 by folding the protruding portion 20 down such that the peripheral edge portion of the insertion hole 36B rotates in the direction of arrow R.

As shown in FIG. 3, the upper and lower ends of the inflator 14 are retained by a mounting bracket 42 arranged outside of the side air bag 12. The lower end of the inflator 14 is inserted through the through-hole 34C on the lower side of the lower base cloth 34 (and the through-hole 36C on the lower side, in the vertical direction of the vehicle, of the tube base cloth 36) and connected to the mounting bracket 42. Two (i.e., upper and lower) stud bolts 43, for example, are provided on this mounting bracket 42. As shown in FIG. 1, the mounting bracket 42 is fixed to a seat back frame 44 of the seat back 28 using these stud bolts 43.

Incidentally, instead of using the mounting bracket 42, stud bolts may be provided upright on the inflator 14 or a defuser, not shown, and these stud bolts may be inserted through the tube base cloth 36 and the lower base cloth 34 and fastened (i.e., fixed) to the seat back frame 44.

When the inflator 14 is arranged in the tube 24 and is activated during a side collision, inflation gas is first supplied to the tube 24. This gas causes the tube 24 to inflate and deploy before the upper bag portion 16 and the lower bag portion 18 do.

Although not shown in the drawings, the inflator 14 is connected to an air bag ECU via a wire harness, and is activated by an activation current from this air bag ECU so as to supply the inflation gas to the side air bag 12. The air bag ECU sends this activation current to the inflator 14 when it has been determined, according to a signal from a crash sensor, not shown, that a side collision has occurred.

A manufacturing method of a side air bag according to this example embodiment includes seven steps that are illustrated in FIGS. 8 to 15. Incidentally, FIGS. 8 to 15 are projection views to clearly show the position of each sewn portion.

In the first step, the tube base cloth 36 is sewn to the bag inner surface side of the lower base cloth 34, as is indicated by the sewn portion S1 in FIG. 9. As shown in FIG. 8, the lower base cloth 34 and the tube base cloth 36 are both shaped so that they can be folded in two about the folding axis CL, i.e., they both have a line-symmetric shape. The through-hole 34C is formed on the folding axis CL, for example, in the lower base cloth 34. Also, the insertion hole 36B that is slit-shaped, for example, and the through-hole 36C that is circular, for example, are also formed on the folding axis CL, for example, in the tube base cloth 36.

The upper regions 34U of the lower base cloth 34 fork-off from the main portion of the lower base cloth 34. When sewing the tube base cloth 36 to the lower base cloth 34, the tube base cloth 36 is positioned on the lower base cloth 34 such that the through-hole 36C in the tube base cloth 36 is aligned with the through-hole 34C in the lower base cloth 34, as shown in FIG. 9. Then the tube base cloth 36 is attached to the lower base cloth 34 by sewing the peripheral edge portions of the through-holes 34C and 36C together.

Incidentally, in order to inhibit gas from leaking out of the through-holes 34C and 36C when the side air bag 12 inflates and deploys, packing, not shown, may be overlapped with and sewn to each of the through-holes 34C and 36C. This packing allows the inflator 14 to be mounted to the mounting bracket 42, and also closes the gap between the through-holes 34C and 36C and the inflator 14 or the mounting bracket 42 to the greatest extent possible.

In the second step, the lower end portions 32L of the upper base cloths 32 are arranged on the bag outer surface side, at the lower ends of the upper regions 34U that are used to form the partition 22, of the lower base cloth 34, and the upper base cloths 32 are then sewn to the lower base cloth 34, as is indicated by the sewn portion S2 in FIG. 10. One upper base cloth 32 is sewn to each of the upper regions 34U that fork off from the main portion of the lower base cloth 34. These upper base cloths 32 are line-symmetrical with respect to the folding axis CL.

In the third step, the tube base cloth 36 is sewn to the bag inner side of the upper regions 34U of the lower base cloth 34, as is indicated by the sewn portions S3 in FIG. 11. The sewing of the tube base cloth 36 to the upper regions 34U of the lower base cloth 34 stops just before reaching the seam allowances 36A on the front end portions 36F of the tube base cloth 36, so as to leave those seam allowances 36A.

In the fourth step, the areas of the outer peripheries 32A of the upper base cloths 32 and the outer periphery 34A of the lower base cloth 34 that overlap with the tube base cloth 36 are sewn to the tube base cloth 36, as is indicated by the sewn portion S4 in FIG. 12.

In the fifth step, the cylindrical tube 24 is formed by folding the tube base cloth 36 in two toward the front of the vehicle (i.e., a valley fold) about the folding axis CL, sewing the resultant front end portions 36F of the tube base cloth 36 together, as is indicated by the sewn portion S5 in FIGS. 2 and 13, and sewing the end edge of the tube base cloth 36 except for at the insertion hole 36B for inserting the inflator 14 in the protruding portion 20 that is exposed from the outer peripheries 32A and 34A of the upper and lower base cloths 32 and 34, e.g., the upper end edge 36U, closed, as is indicated by the sewn portion S51. At this time, the sewn portions S3 stop right before reaching the seam allowances 36A, so the sewn portion S5 is able to be sewn easily.

In the sixth step, the partition 22 is formed by folding the lower base cloth 34 in two about the folding axis CL and sewing the upper regions 34U together, as is indicated by the sewn portion S6 in FIG. 15. The upper regions 34U of this lower base cloth 34 are sewn together up to the sewn portions S3 of the upper regions 34U and the tube base cloth 36 that stop just before reaching the seam allowances 36A.

More specifically, the sewn portion S6 extends toward the rear side from the front side of the upper regions 34U of the lower base cloth 34, and the rear end portion S61 curves upward, for example, upon reaching the front ends S31 of the sewn portions S3, for example, and terminates near the front end portions 36F of the tube base cloth 36.

Incidentally, the shape of the rear end portion S61 of the sewn portion S6 is not limited to this curved shape. For example, as shown in FIG. 13, the sewn portion S6 may also double back toward the front, for example, upon reaching the front end S31 of the sewn portions S3 and terminate near the front end portion 36F of the tube base cloth 36.

In the seventh step, the upper bag portion 16 is formed by sewing the outer peripheries 32A of the upper base cloths 32 together, except for the areas that overlap with the tube base cloth 36, and the lower bag portion 18 is formed by sewing the outer periphery 34A of the lower base cloth 34 to itself, except for the area that overlaps with the tube base cloth 36, as is indicated by the sewn portion S7 in FIG. 15. As a result, the side air bag 12 is formed, as shown in FIG. 2. In this side air bag 12, the upper bag portion 16 and the lower bag portion 18 are separated by the partition 22, and the tube 24 extends through the partition 22 to the lower bag portion 18 side and the upper bag portion 16 side.

Incidentally, with the first, second, and third steps, the order of operations is not limited to that indicated by the step number, but is arbitrary. Thus, the second step or the third step may be performed first. With the fourth to the seventh steps, the steps are performed in the numbered order.

With this manufacturing method of a side air bag, the upper regions 34U of the lower base cloth 34 are used to form the partition 22. As a result, the side air bag 12 having the upper bag portion 16 and the lower bag portion 18 is easier to sew, which enables mass productivity to be improved, compared with when a tether and the base cloth of the side air bag 12 are separate.

Also, in the third step, the tube base cloth 36 is sewn to the bag inner side of the upper regions 34U of the lower base cloth 34. In the fourth step, the areas of the outer peripheries 32A of the upper base cloths 32 and the outer periphery 34A of the lower base cloth 34 that overlap with the tube base cloth 36 are sewn to the tube base cloth 36. In the fifth step, the cylindrical tube 24 is formed by folding the tube base cloth 36 in two toward the front of the vehicle (i.e., a valley fold) about the folding axis CL and sewing the resultant front end portions 36F together. In the sixth step, the partition 22 is formed by folding the lower base cloth 34 in two about the folding axis CL and sewing the upper regions 34U together, thereby making it possible to improve the airtightness between the upper bag portion 16 and the lower bag portion 18.

This operation of the example embodiment structured as described above will now be described. In FIG. 2, with the side air bag apparatus 10 according to this example embodiment, the partition 22 that separates the upper bag portion 16 from the lower bag portion 18 is made up of the upper regions 34U of the lower base cloth 34, and formed by sewing together the upper regions 34U of the lower base cloth 34 that has been folded in two about the folding axis CL (FIG. 14). As a result, the side air bag 12 having the upper bag portion 16 and the lower bag portion 18 is easier to sew, which enables mass productivity to be improved, compared with when a tether and the base cloth of the side air bag 12 are separate.

Also, the tube 24 that extends through the partition 22 to the lower bag portion 18 side and the upper bag portion 16 side, as shown in FIGS. 1 to 3 and 6, so as to distribute inflation gas to the upper bag portion 16 and the lower bag portion 18 is formed in a cylindrical shape by sewing the tube base cloth 36 that has been sewn to the lower base cloth 34 by the sewn portion S1 to the upper regions 34U of the lower base cloth 34 by the sewn portions S3, as shown in FIG. 12, folding that tube base cloth 36 in two toward the front of the vehicle (i.e., a valley fold) about the folding axis CL, sewing the resultant front end portions 36F together in the length direction of the tube 24 by the sewn portion S5, as shown in FIG. 13, and sewing the end edge except for at the insertion hole 36B in the protruding portion 20, e.g., the upper end edge 36U, closed, by the sewn portion S51, as shown in FIG. 14. Meanwhile, the partition 22 is formed by sewing the upper regions 34U of the lower base cloth 34 that has been folded in two about the folding axis CL together by the sewn portion S6. As a result, the airtightness between the upper bag portion 16 and the lower bag portion 18 can be improved.

The front ends S31 of the sewn portions S3 of the tube base cloth 36 and the upper regions 34U stop right before reaching the seam allowances 36A of the front end portions 36F of the tube base cloth 36 in order to facilitate sewing the front end portions 36F of the tube base cloth 36 together (i.e., the sewn portion S5). However, as shown in FIG. 14, the rear end portion S61 of the sewn portion S6 of the upper regions 34U of the lower base cloth 34 reaches the front ends S31 of the sewn portions S3, so a gap, not shown, between the sewn portions S3 and the sewn portion S5 is closed. As a result, movement of the gas between the upper bag portion 16 and the lower bag portion 18 through the gap is suppressed, so airtightness can be further improved.

In this way, with the side air bag apparatus 10, the side air bag 12 having the upper bag portion 16 and lower bag portion 18 that are separated from each other can be sewn easily, which enables mass productivity to be improved, and also enables the airtightness between the upper bag portion 16 and the lower bag portion 18 to be improved.

Furthermore, as shown in FIG. 4, the insertion hole 36B in the protruding portion 20 is formed in the rear end portion of the protruding portion 20 of the tube base cloth 36, and the inflator 14 is inserted into the tube 24 through the insertion hole 26B and arranged so that the longitudinal direction of the inflator 14 is the same as the vertical direction of the side air bag 12. The protruding portion 20 is folded down such that the peripheral edge portion of the insertion hole 36B fits around the inflator 14, and fastened or held (i.e., fixed) to the inflator 14 by the clamp 21. As a result, the protruding portion 20 of the tube base cloth 36 can be inhibited from sticking out after the inflator 14 has been assembled.

Next, operation during a side collision will be described. In FIG. 1, when the air bag ECU determines, based on a signal from a crash sensor, not shown, that a side collision has occurred, an activation current is sent from the air bag ECU to the inflator 14. Upon receiving this activation current, the inflator 14 activates and injects a large amount of gas from gas injection holes, not shown. This supply of gas into the side air bag 12 causes the side air bag 12 to project outward from the seat back 28 and inflate and deploy to the side of the occupant 30.

Here, the protruding portion 20 that is exposed from the outer peripheries 32A of the upper base cloths 32 and the outer periphery 34A of the lower base cloth 34 and in which the insertion hole 36B for inserting the inflator 14 is formed is provided at a portion of the tube base cloth 36, as shown in FIG. 2. The inflator 14 is inserted into the side air bag 12 through this insertion hole 36B. The peripheral edge end of this insertion hole 36B is fastened or held (i.e., fixed) to the inflator 14 by the clamp 21. The upper base cloths 32 are not sewn together in the areas where the outer peripheries 32A of the upper base cloths 32 overlap with the tube base cloth 36, and the lower base cloth 34 is not sewn to itself in the area where the outer periphery 34A of the lower base cloth 34 overlaps with the tube base cloth 36.

Accordingly, when the inflator 14 activates, the side air bag 12 is also able to inflate in the areas where the outer peripheries 32A of the upper base cloths 32 and the outer periphery 34A of the lower base cloth 34 overlap with the tube base cloth 36. Therefore, the pressure of the gas can be inhibited from concentrating near the insertion hole 36B for the inflator 14 when the side air bag 12 inflates and deploys, without affecting the bag outer shape of the side air bag 12. Further, as a result, the side air bag 12 is also able to restrain the occupant 30 at the area where the outer peripheries 32A of the upper base cloths 32 and the outer periphery 34A of the lower base cloth 34 overlap with the tube base cloth 36.

Further, the inflator 14 is arranged inside the tube 24, and this tube 24 inflates and deploys before the upper bag portion 16 and the lower bag portion 18 do from the inflation gas supplied from the inflator 14 during a side collision. As a result, during a side collision, the occupant 30 can be initially restrained by this tube 24. Also, the restraining force during initial restraint can be adjusted by the position of the tube 24. Furthermore, the tube 24 forces the side air bag 12 to be deployed in the vertical direction of the vehicle, so inflation and deployment of the side air bag 12 are rapid and stable.

Moreover, in this example embodiment, the tube 24 is made of cloth that can inflate and deploy together with the side air bag 12, so the side air bag 12 is able to be made longer in the vertical direction of the vehicle than a side air bag that distributes gas by a metal retainer, not shown. Also, the flow of gas can be controlled by the arrangement, length, and shape, and the like of the tube 24.

The gas supplied from the inflator 14 is distributed into the lower bag portion 18 from the open portion 38 at one end 24L of the tube 24, and into the upper bag portion 16 from the open portion 40 at the other end 24U, as shown in FIG. 6. As a result, the lower bag portion 18 and the upper bag portion 16 each inflate and deploy. At this time, in this example embodiment, the upper bag portion 16 inflates and deploys in a position at a height corresponding to that of both the chest 30C and the shoulder 30S of the occupant 30 seated in the vehicle seat 26, and the lower bag portion 18 inflates and deploys in a position at a height corresponding to that of the waist 30W of the occupant 30. Accordingly, during a side collision, both the chest 30C and the shoulder 30S of the occupant 30 can be restrained by the upper bag portion 16, and the waist 30W of the occupant 30 can be restrained by the lower bag portion 18.

Figure 5:
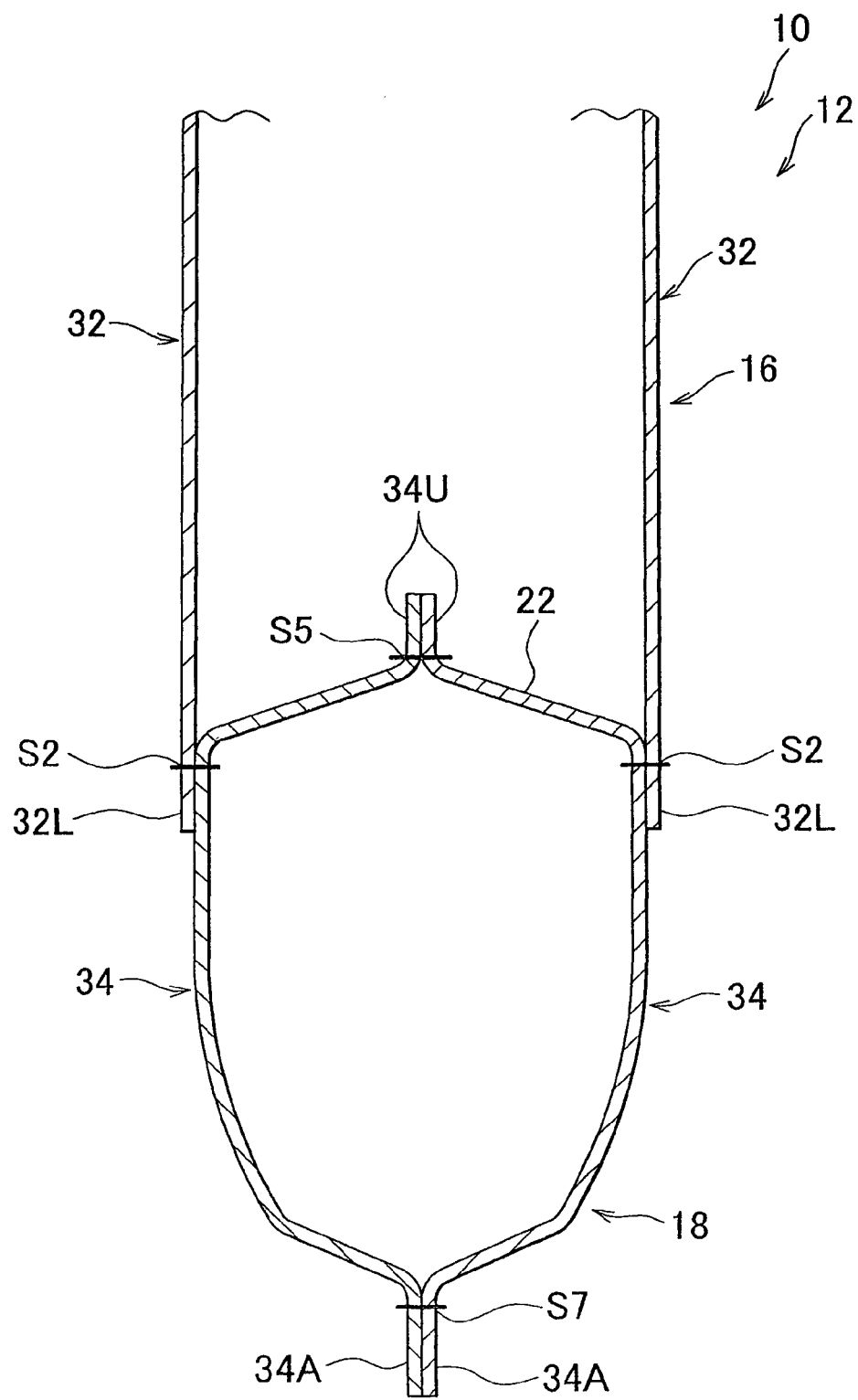
FIG. 5 is an enlarged sectional view taken along line V-V of the side air bag shown in FIG. 2.

In particular, as shown in FIG. 5, with this example embodiment, separating the upper bag portion 16 and the lower bag portion 18 by providing the partition 22 makes it possible to ensure greater bag thickness at the location of the partition 22 when the side air bag 12 inflates and deploys, compared with when the bag is divided by sewing the base cloths together.

Also, the internal pressure in the lower bag portion 18 when the side air bag 12 inflates and deploys is set higher than the internal pressure in the upper bag portion 16, so focus can be placed on restraining the waist 30W of the occupant 30, where the tolerance against a lateral load F (FIG. 6) is relatively high, by the lower bag portion 18.

Furthermore, in this example embodiment, the coating for increasing airtightness is applied to the inner surface of the lower base cloth 34, while that coating is not applied to the inner surfaces of the upper base cloths 32. This kind of simple structure makes it possible to apply an internal pressure difference between the upper bag portion 16, and the lower bag portion 18 over a longer period of time when the side air bag 12 inflates and deploys.

Incidentally, as shown in FIG. 6, the tube 24 is made of cloth. Therefore, even if the gas inside the lower bag portion 18 attempts to move to the upper bag portion 16 side through the tube 24 when a lateral load F is applied to the lower bag portion 18, such movement of the gas is inhibited by the one end 24L closing, as shown by the alternate long and two short dashes line, so that the internal pressure difference between the upper bag portion 16 and the lower bag portion 18 can be maintained.

Figure 16A:
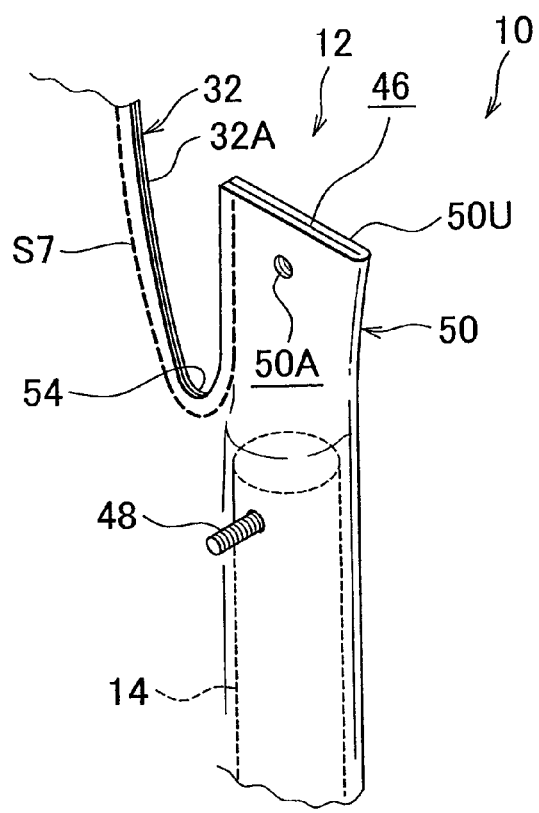
FIG. 16A is a perspective view of the inflator inserted into the side air bag through the insertion hole in the protruding portion of the side air bag apparatus according to a modified example.

With the side air bag apparatus 10 according to a modified example shown in FIG. 16A, a protruding portion 50 having an insertion hole 46 for inserting the cylindrical inflator 14 inside is provided in the side air bag 12 that inflates and deploys upon receiving a supply of gas from the inflator 14 during a side collision. This protruding portion 50 is formed protruding upward with respect to the vehicle on an upper portion on the side toward the rear of the vehicle of the upper base cloths 32, for example, and the insertion hole 46 is provided in the upper end 50U of the protruding portion 50, for example. A stud bolt 48, for example, is provided upright on the side of the upper portion of the inflator 14, and a through-hole 50A that corresponds to the stud bolt 48 is formed in the protruding portion 50.

The inflator 14 is inserted into the side air bag 12 from the upper end 50U of the protruding portion 50, and is arranged so that the vertical direction of the side air bag 12 is the same as the longitudinal direction of the inflator 14. At this time, the height position of the upper end of the inflator 14 corresponds to the lowest portion 54 of the outer periphery 32A on the front side of the vehicle of the protruding portion 50, or more specifically, is set slightly lower than the sewn portion S7 of the lowest portion 54.

Figure 16B:
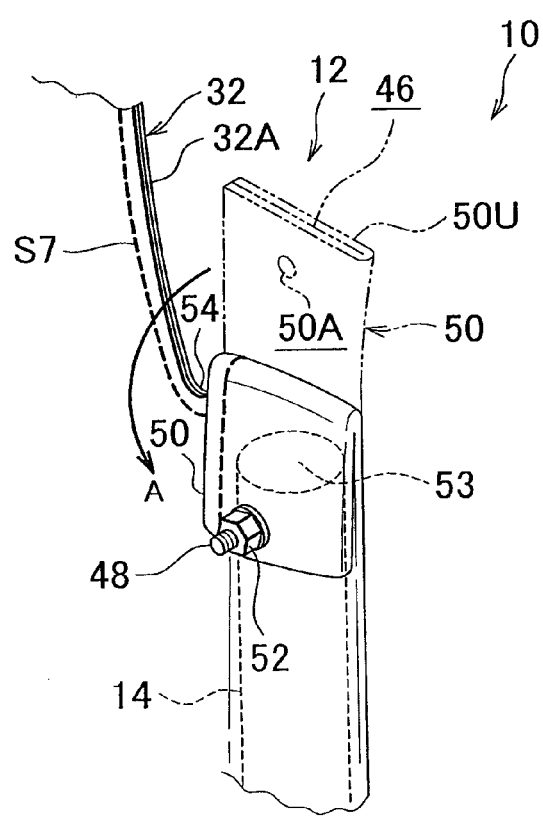
FIG. 16B is a perspective view of the protruding portion folded down alongside the inflator and fastened (i.e., fixed) to the inflator.

As shown in FIG. 16B, the protruding portion 50 is folded down in the direction of arrow A at the height position of the lowest portions 54 of the outer peripheries 32A of the upper base cloths 32, for example, on the side of the inflator 14 (i.e., next to the inflator 14), such that the stud bolt 48 sticks through the through-hole 50A. Then, the protruding portion 50 is fastened (i.e., fixed) to the inflator 14 by a nut 52, for example, so as to close off the insertion hole 46. In this state, some degree of space 53 is preferably created between the upper end surface of the inflator 14 and the upper end of the protruding portion 50 that has been folded down, so that stress does not concentrate at the lowest portions 54 of the outer peripheries 32A of the upper base cloths 32 when the inflator 14 is activated.

In this modified example, the upper end of the inflator 14 is set to a height position that corresponds to the lowest portions 54 of the outer peripheries 32A, and the protruding portion 50 is folded down next to the inflator 14 at the height position of the lowest portions 54 of the outer peripheries 32A of the upper base cloths 32 and fastened and held there. As a result, the pressure of the gas is not as likely to concentrate at the sewn portion S7 when the inflator 14 is activated as it is with a side air bag in which the protruding portion 50 is fastened to the inflator 14 without being folded down. Further, the side air bag 12 is also able to inflate in the region toward the front of the side air bag 12 at the upper end of the inflator 14. Therefore, the occupant 30 (FIG. 1) can be restrained also in the region toward the front of the vehicle at the upper end of the inflator 14, without changing the contour of the outer peripheries 32A of the upper base cloths 32.

Incidentally, this modified example describes a structure that does not have the tube 24 (see FIG. 2), but the protruding portion 50 may also be structured as part of the tube 24. Also, the means for fastening and holding (i.e., fixing) the protruding portion 50 to the inflator 14 is not limited to the stud bolt 48 and the nut 52. That is, a clip or the like may also be used.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A side air bag apparatus comprising:
an inflator that injects gas during a side collision; and
a side air bag that has an upper bag portion formed by sewing upper base cloths together; a lower bag portion that is formed by sewing a lower base cloth to itself and positioned below the upper bag portion; a partition that separates the upper bag portion from the lower bag portion; and a tube that i) is formed by a tube base cloth and extends through the partition to the lower bag portion side and the upper bag portion side, ii) has a first open portion provided on one end that is positioned on the lower bag portion side, and a second open portion provided on the other end that is positioned on the upper bag portion side, and iii) distributes the gas from the inflator to the upper bag portion and the lower bag portion, wherein:
a protruding portion that is exposed from outer peripheries of the upper base cloths and the lower base cloth is provided on a portion of the tube base cloth;
an insertion hole for the inflator is formed in the protruding portion;
the upper base cloths are not sewn together in areas where the outer peripheries of the upper base cloths overlap with the tube base cloth, and the lower base cloth is not sewn to itself in an area where an outer periphery of the lower base cloth overlaps with the tube base cloth;
the tube base cloth is sewn together with at least one of the upper base cloths and the lower base cloth; and
a peripheral edge portion of the insertion hole in the protruding portion is fixed to the inflator by a clamp.

2. The side air bag apparatus according to claim 1, wherein:
the tube is formed by sewing the tube base cloth that has been sewn to the lower base cloth to an upper end portion of the lower base cloth, folding the tube base cloth in two toward the front of a vehicle about a folding axis, sewing a resultant front end portions together in a length direction of the tube, and sewing an end edge of the protruding portion, except for at the insertion hole, closed;
the partition is formed by sewing together the upper end portions of the lower base cloth that has been folded in two about the folding axis; and
the upper bag portion is formed by sewing the outer peripheries of the upper base cloths together and the lower bag portion is formed by sewing the outer periphery of the lower base cloth to itself.

3. The side air bag apparatus according to claim 1, wherein:
the upper bag portion is positioned at at least one of chest and shoulder height of an occupant seated in a vehicle seat; and
the lower bag portion is positioned at waist height of the occupant.

4. The side air bag apparatus according to claim 1, wherein:
the insertion hole is formed in a rear end portion of the protruding portion;
the inflator is provided in the tube via the insertion hole and is arranged such that a length direction of the inflator is the same as a vertical direction of the side air bag; and
the protruding portion is folded down such that the peripheral edge portion of the insertion hole fits around the inflator, and fixed by the clamp.

5. The side air bag apparatus according to claim 1, wherein a coating for increasing airtightness is applied to an inner surface of the lower base cloth, and the coating is not applied to inner surfaces of the upper base cloths.

6. A manufacturing method of a side air bag, comprising:
sewing a tube base cloth to a bag inner surface side of a lower base cloth;
sewing lower end portions of upper base cloths to a bag outer surface side, at lower ends of upper regions that are used to form a partition, of the lower base cloth;
sewing the tube base cloth having an insertion hole for an inflator to a bag inner surface side of the upper regions;
sewing areas of outer peripheries of the upper base cloths and an outer periphery of the lower base cloth that overlap with the tube base cloth to the tube base cloth;
forming a tube by folding the tube base cloth in two toward a front side of a vehicle about a folding axis, sewing a resultant front end portions together, and sewing the end edge, except for at the insertion hole, of a protruding portion that is exposed from the outer peripheries of the upper base cloths and the lower base cloth, of the tube base cloth closed;

forming the partition by folding the lower base cloth in two about the folding axis and sewing upper regions together; and forming an upper bag portion by sewing the outer peripheries of the upper base cloths together except for at areas that overlap with the tube base cloth, and forming a lower bag portion by sewing the outer periphery of the lower base cloth to itself except for at an area that overlaps with the tube base cloth.

* * * * *